United States Patent [19]

Tallman

[11] 3,915,471

[45] Oct. 28, 1975

[54] OUTRIGGER STABILIZER AND LEVELER

[76] Inventor: Erven Tallman, 6531 Bedford Ave., Los Angeles, Calif. 90056

[22] Filed: Oct. 15, 1973

[21] Appl. No.: 406,698

[52] U.S. Cl............................. 280/150.5; 254/86 H
[51] Int. Cl.²........................................... B60S 9/00
[58] Field of Search...... 280/150.5; 254/86 R, 86 H; 248/352, 354; 212/145

[56] References Cited
UNITED STATES PATENTS

| | | | |
|---|---|---|---|
| 3,345,038 | 10/1967 | Taylor............................ | 280/150.5 |
| 3,362,683 | 1/1968 | Hansen........................... | 254/86 H |
| 3,767,226 | 10/1973 | Stephens......................... | 280/150.5 |
| 3,801,068 | 4/1974 | Kopas............................. | 280/150.5 |
| 3,801,128 | 4/1974 | Herndon.......................... | 280/150.5 |

*Primary Examiner*—Philip Goodman
*Assistant Examiner*—John A. Carroll

[57] ABSTRACT

An outrigger for a vehicle of the camper type has a leg pivotally attached to the chassis at each of four corners. Each leg is normally carried in an elevated substantially horizontal position. A hydraulic cylinder acting between the chassis and the leg swings the leg arcuately downwardly until a foot on each leg engages the ground in a position bracing the vehicle against a laterally tilting or rocking motion. Continued application of hydraulic power shifts the feet inwardly over the ground surface whereby to lift the vehicle clear of the ground. A control panel of four double acting hydraulic valves, each equipped with an operating handle, is used to operate each leg individually or to operate all legs simultaneously.

4 Claims, 25 Drawing Figures

OUTRIGGER STABILIZER AND LEVELER

Unlike the average passenger automobile or truck, motor vehicles such as campers and also vehicles such as house trailers when parked need a structure of some kind acting between the frame of the vehicle and the ground to prevent the vehicle from tilting. It is also of course necessary to have some type of jack structure to lift one wheel or another of the vehicle free of the supporting surface should it be necessary to change a tire or remove one wheel or another for some purpose.

When a conventional jack is depended upon for such an expedient, there is always present the disadvantage of extra or separate jack devices which must be removed from the vehicle and then installed in place. Such extra devices are not always present when needed or present in sufficient number and because they are loose, they are prone to become misplaced and lost.

On those occasions when permanent jack structures, commonly called outriggers, are permanently installed in place on the vehicle they have not been designed and mounted with sufficient compactness to avoid being objectionable protuberances. Many such vehicles are slung sufficiently close to the ground to make installation of permanent outriggers cumbersome and objectionable. Such outriggers also have frequently been unnecessarily complicated and expensive and therefore not sufficiently dependable for all-round use.

Further still, unless the outrigger is sufficiently well designed and powerful to serve not only as a brace but also as a jack, then there is the objection of there being too many devices needed to serve both as a means of steadying the vehicle and as a jack for lifting it off the ground.

It is therefore among the objects of the invention to provide a new and improved supporting jack structure for a motor vehicle which in one position of adjustment serves as a brace to prevent the vehicle from being tilted toward one side or the other and which can be operated additionally to serve as a jack for lifting the vehicle off the ground.

Another object of the invention is to provide a new and improved supporting jack structure for motor vehicles which is of simple construction and compact in design sufficient to enable it to be mounted beneath the chassis of the vehicle at a location substantially well removed to avoid unwanted protuberances and which is capable of being quickly adjusted as an outrigger for bracing the vehicle and which also can be additionally adjusted to serve as a jack.

Still another object of the invention is to provide a new and improved supporting jack structure which is especially rugged in its design and construction so that it can serve effectively to hold the vehicle in a desired position without prospect of parts buckling and failing.

Still another object of the invention is to provide a new and improved supporting jack structure for motor vehicles which has an adjustable extension means making it possible to use the same structure on vehicles which may have the chassis slung at various different heights, the structure being extendable and retractable by simple means so that the same mechanical motion and power plant can be used on any one of a number of the different vehicles.

Still another object of the invention is to provide a new and improved supporting jack structure for motor vehicles which is of such design that when a heavy thrust is needed to either support the vehicle or lift it from the ground surface, the thrust is substantially endwise thereby making it possible to build adequate ruggedness into the structure without adding unnecessarily to its weight.

Also included among the objects of the invention is to provide a new and improved supporting jack structure for motor vehicles which has a ground-engaging foot bearing such relationship to a supporting leg that the foot, when in engagement with the ground, serves as a pad irrespective of the softness or roughness of the ground whereby any one or, in fact, all of the wheels of the vehicle may be lifted clear of the ground whenever necessary and which, when further need for the structure has passed, permits the structure to be quickly and readily withdrawn to initial position, compact and removed to a location underneath the vehicle where it will not be in the way during travel.

Further among the objects of the invention is to provide a new and improved hydraulically controlled outrigger and jack structure for a vehicle controlled from a common panel at which the hydraulic jack can be manipulated singly or in any combination to either raise or lower the vehicle to any desired degree.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 13 is a cross sectional view taken on the line 13—13 of FIG. 12a.

Figure 1:
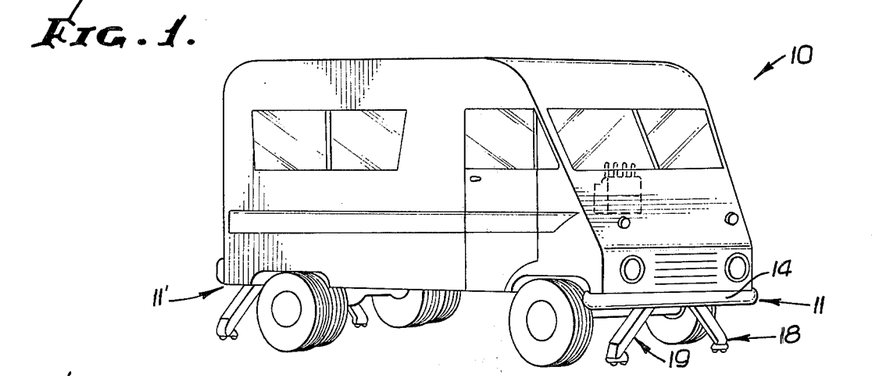
FIG. 1 is a side perspective view of a typical motor vehicle equipped with the supporting jack structure.

In an embodiment of the invention chosen for the purpose of illustration, there is shown a motor vehicle 10 commonly termed a camper or on occasions a motor home, camper bus or mini-bus. The motor home camper is shown equipped at its forward end with a supporting jack structure 11. The supporting jack structure is shown at the front of the vehicle, but it will be understood that this is by way of example and that a comparable supporting jack structure 11' also is used at the rear.

The camper 10 is of substantially conventional construction in that it is built upon a chassis comprising in part forward chassis members 12 and 13 which are located on the underside of the vehicle immediately to the rear of a bumper 14.

The supporting jack structure 11 consists of a transversely extending beam 15 having a box-like structure 15' with ears 16 on one side attached to the chassis member 12 by bolts 17 extending through a plate 17'. A similar structure on the opposite side is attached to the chassis member 13.

To provide lightness as well as strength, the beam 15 is a hollow rectangular tube. The box like structures 15' are identical except for the respective left and right-hand relationships. Leg assemblies 18 and 19 at respective right and left-hand ends of the beam 15 are also substantially the same except for right and left-hand relationship. Accordingly, a detailed description will be provided for only one, namely, the leg assembly on the port side of the vehicle which is the right-hand side as viewed in FIGS. 1, 2, 3, and 4.

Figures 5, 6, 7:
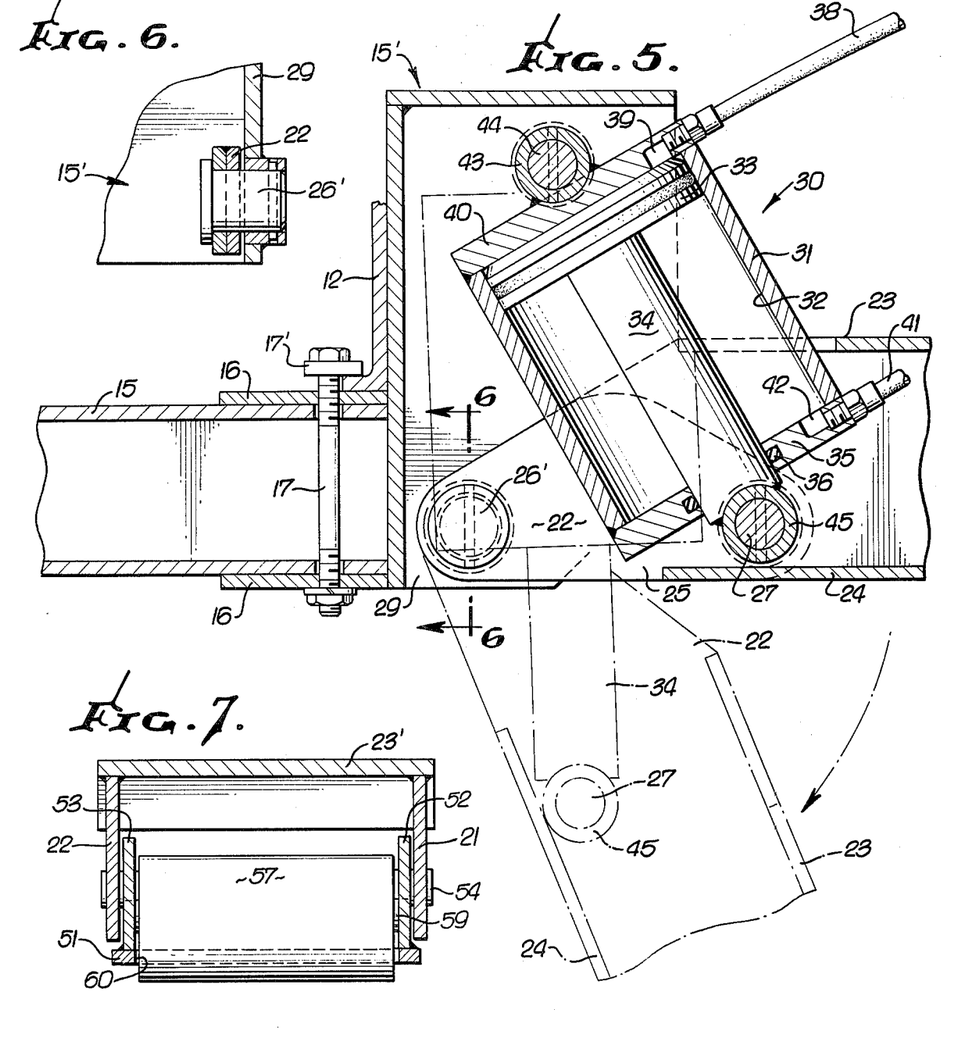
FIG. 5 is a fragmentary longitudinal sectional view of the structure on the port side of the vehicle taken on the line 5—5 of FIG. 3.
FIG. 6 is a fragmentary cross sectional view taken on the line 6—6 of FIG. 5.
FIG. 7 is a fragmentary cross sectional view taken on the line 7—7 of FIG. 2.

The leg assembly consists in the main of a leg 20 having side walls 21 and 22, a top wall 23 and a bottom wall 24. There is an extra top plate 23' near the free end. A captive end 25 of the leg 20 is provided with pivot pins 26 and 27 on respectively opposite sides, the pivot pin 27 extending outwardly through side wall 29 of the box-like structure 15', as shown in FIG. 6, thereby to pivotally mount the leg assembly 18 on the respective end of the beam 15.

Figure 2:
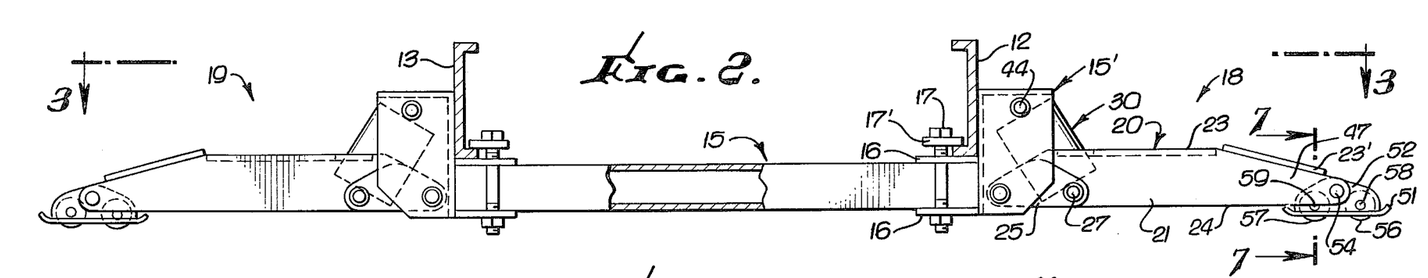
FIG. 2 is a side elevational view partially in section showing the supporting jack structure.
Figure 3:
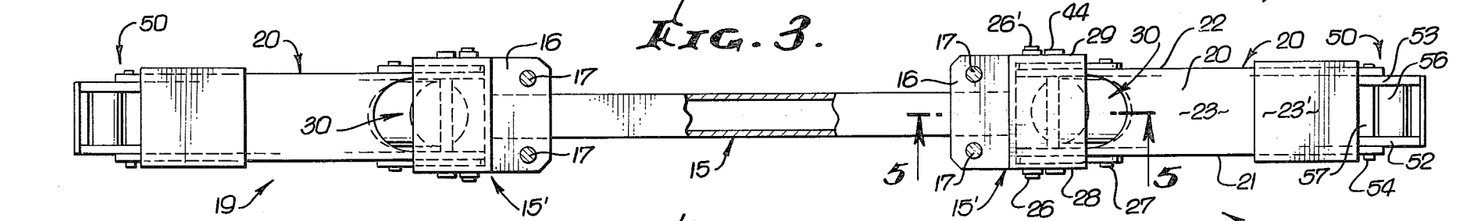
FIG. 3 is a plan view of the supporting jack structure taken on the line 3—3 of FIG. 2.
Figure 4:
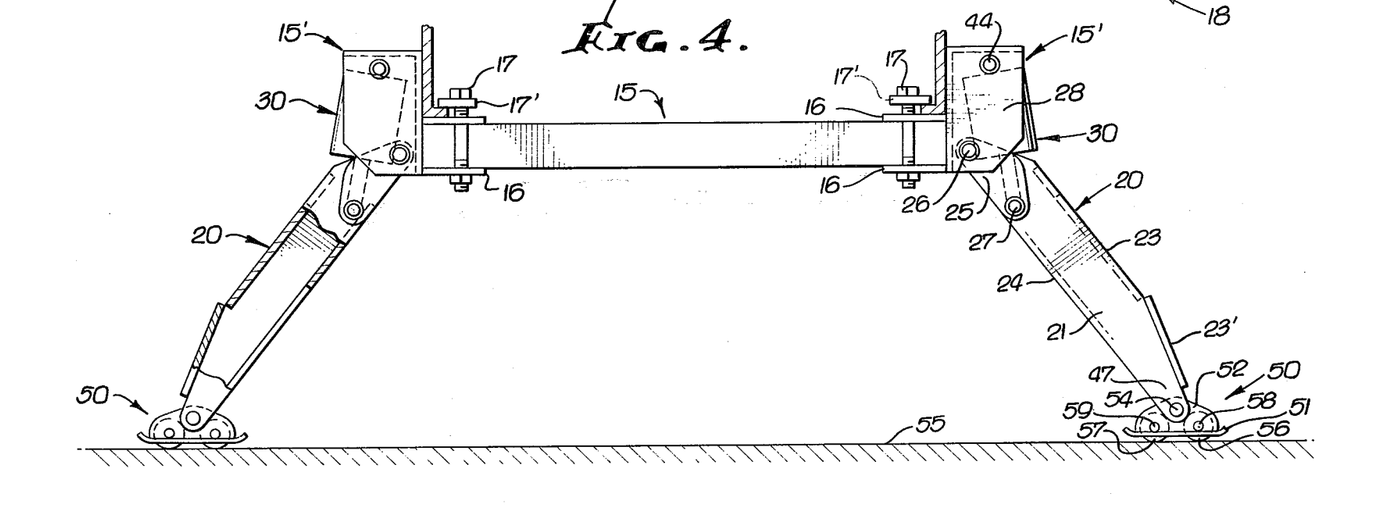
FIG. 4 is a front elevational view of the supporting jack structure partially in section and showing the structure in position for bracing the vehicle against tilting.

For shifting the leg assembly 18 from the initial elevated position of FIG. 2 to the downwardly extending operative position of FIG. 4, there is provided a hydraulic motor indicated generally by the reference character 30. The hydraulic motor consists of a cylinder member 31 having a chamber 32 located inside and a piston 33 reciprocatably mounted in the chamber 32.

On the piston is a piston rod member 34 which has a sliding engagement in a header 35 sealed by a resilient ring 36.

To supply hydraulic power to the hydraulic motor, one pressure line 38 communicates with a port 39 in a header 40. A second pressure line 41 communicates with a port 42 in the header 35.

The upper end of the cylinder member 31 has a bearing sleeve 43 which is pivotally secured by means of a pivot shaft 44 to the side walls 28 and 29 of the box-like structure. At the other end of the hydraulic motor 30, a bearing sleeve 45 is anchored in transversely extending direction to the outer end of the piston rod member 34. The pivot shaft 27 extends through the bearing sleeve and is secured to the opposite side walls 21 and 22 of the leg assembly 18 thereby to pivotally mount the piston rod member 34 to the leg assembly.

An outer or free end 47 of the leg assembly 20 is provided with a foot indicated generally by reference character 50. The foot consists of a ground-contacting shoe 51 having spaced parallel flanges 52 and 53. A pivot pin 54 extends through the side flanges 52 and 53 and the side walls 21 and 22 of the leg 20 to pivotally mount the foot at the free end 47 of the leg. To improve the ease of sliding the foot over a supporting surface 55, particularly when the surface is hard, use is made of two spaced parallel rollers 56 and 57 supported on respective shafts 58 and 59 on the side flanges 52, 53. The rollers extend through an opening 60 in the shoe 51 to locations below the lower face of the shoe.

In operation the leg assemblies 18 and 19 are normally held in uppermost position, as shown in FIG. 2, by action of the hydraulic motor 30. When the leg assemblies are to be extended, which customarily occurs simultaneously, the hydraulic motors are actuated, which means that the pistons 33 are driven from the upper position, illustrated in FIG. 5, downwardly. The leg assemblies accordingly are driven in an arcuate direction from the solid line positions of FIGS. 2, 3 and 5 to the solid line positions of FIG. 4 and as shown by the broken line in FIG. 5. Once the foot has struck the supporting surface 55, such as the surface of the ground, there is sufficient contact to enable the outrigger to prevent the vehicle from tilting toward one side or the other as persons occupying it move around.

Should it become necessary to lift the end of the vehicle off the ground, as for example to have the vehicle wheels clear in order to change the tire, actuation of the hydraulic motors 30 is continued. The result of such a continuing actuation is to shift the foot from the solid line position of FIG. 4, over the supporting surface 55, until the leg assemblies 18 and 19 are in substantially vertical positions whereby to lift the wheels of the vehicle clear of the ground.

In other words, as the hydraulic motors 30 continue to operate, the beam 15 is lifted and this, in turn, lifts the chassis members 12 and 13 and the vehicle to an elevated position above the solid line positions of FIG. 4.

Conversely, when the vehicle is to be lowered, hydraulic pressure in the hydraulic motors is reversed and this moves the piston 33 and piston rod member 34 upwardly. This action serves to lift on the pivot pin 27 tilting the leg assembly 18, for example, in a counterclockwise direction and the leg assembly 19 in a clockwise direction from first the solid line positions of FIG. 4 to the solid line positions of FIG. 2.

In the embodiment of the invention of FIGS. 8 through 13 inclusive, the hydraulic motor is incorporated in and made part of a leg assembly indicated generally by the reference character 70. As in the initially described form of the invention, there are normally four such leg assemblies at four ends respectively of a chassis 71.

For convenience there is provided a frame 72 which is fastened by some conventional means to the chassis and which provides a mounting for the articulating parts of the leg assembly consisting in the main of a hydraulic cylinder assembly 73 and a link 74.

Figure 12A:
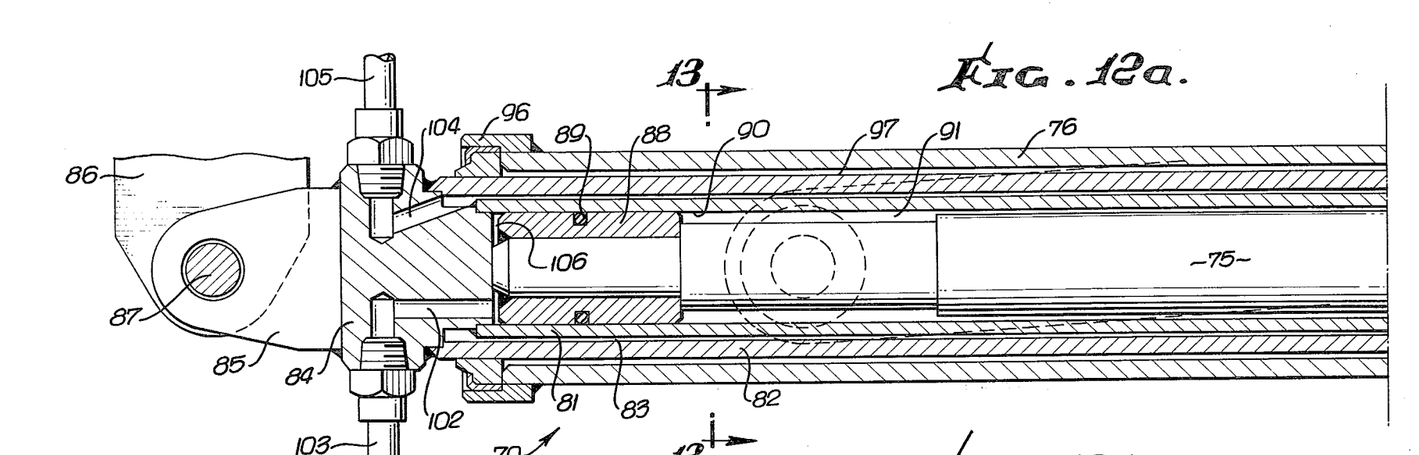
FIGS. 12a and 12b are sectional views which, taken together, comprise the longitudinal sectional view taken on the line 12—12 of FIG. 9.
Figure 12B:
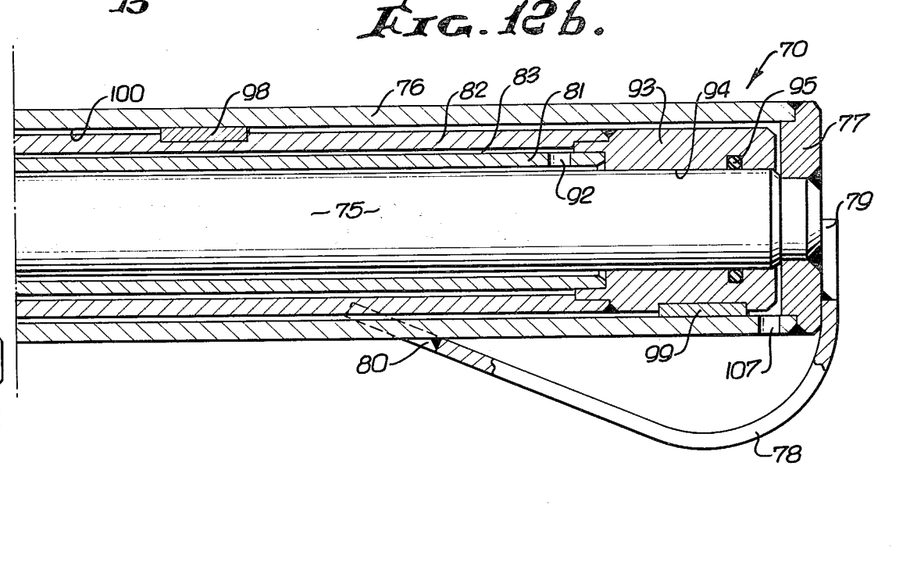
Figure 13:
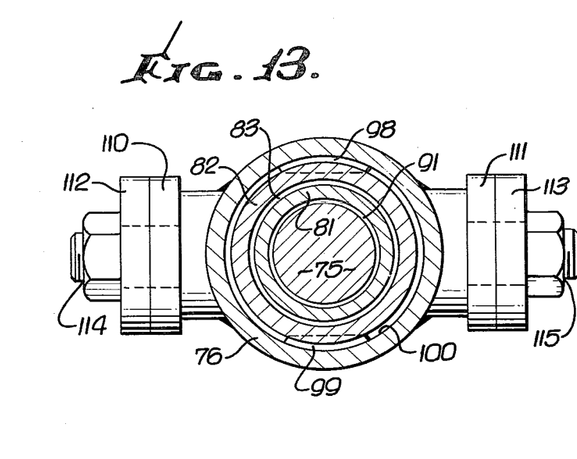

The hydraulic cylinder assembly consists of a plurality of concentric telescoping tubes and a central piston rod 75, best shown in FIGS. 12a and 12b. An outer jacket 76 is fastened at its free end to the free end of the piston rod 75 by employment of a ring 77, so that the jacket and the piston rod act as a unitary assembly. A foot piece 78 has one end 79 welded to the piston rod and the other end 80 welded to an intermediate portion of the jacket 76.

The hydraulic cylinder assembly consists of an innermost tube 81 and an intermediate tube 82. The tubes are spaced from each other forming an annular elongated space or chamber 83, both tubes being anchored to a header 84. On the header is a bracket 85 pivotally secured to a bracket 86 on the frame 72 by means of a pivot pin 87.

A piston head 88 on the piston rod 75 has a sliding seal 89 which engages the inside surface 90 of the innermost tube 81. Inasmuch as the piston rod 75 is spaced from the surface 90, there is formed a chamber 91. The chamber 91 is interconnected with the chamber 83 by a passage 92. A header 93 anchored to the outer end of the intermediate tube 82 is provided with an opening 94 to slidably accommodate the piston rod 75 and a sliding seal 95. A bushing 96 has a sliding engagement with the exterior surface 97 of the intermediate tube 82. Stress pads 98 and 99 respectively in the intermediate tube 82 and the header 93 slidably engage the inside surface 100 of the jacket 76 whereby to hold the tubes in spaced relation when the foot piece is forced into contact with a supporting surface 101. A vent 107 extends through the wall of the jacket 76 near the free end.

In the header 84 is a passage 102 fed by a hydraulic line 103 and a second passage 104 fed by a hydraulic line 105. The passage 102 communicates with a chamber 106 adjacent the head end of the piston head 88 whereby to extend the leg assembly when hydraulic pressure is applied to the chamber 106. The passage 104 communicates with the chamber 83 and acts through the chamber 91 on the opposite end of the piston head 88 for retracting the leg assembly.

Figure 8:
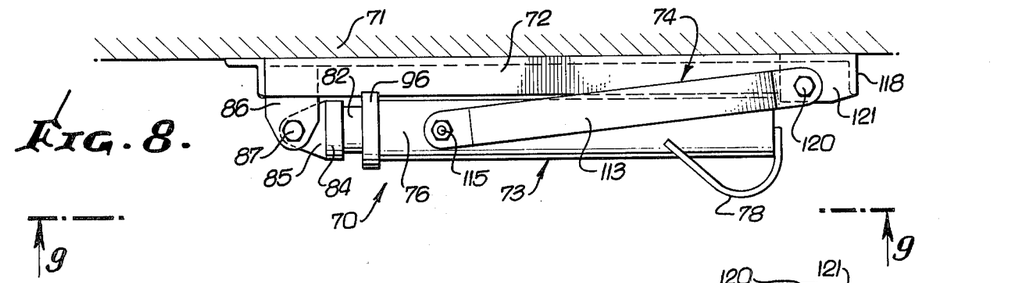
FIG. 8 is a side elevational view of a second form of the invention in retracted position.
Figure 9:
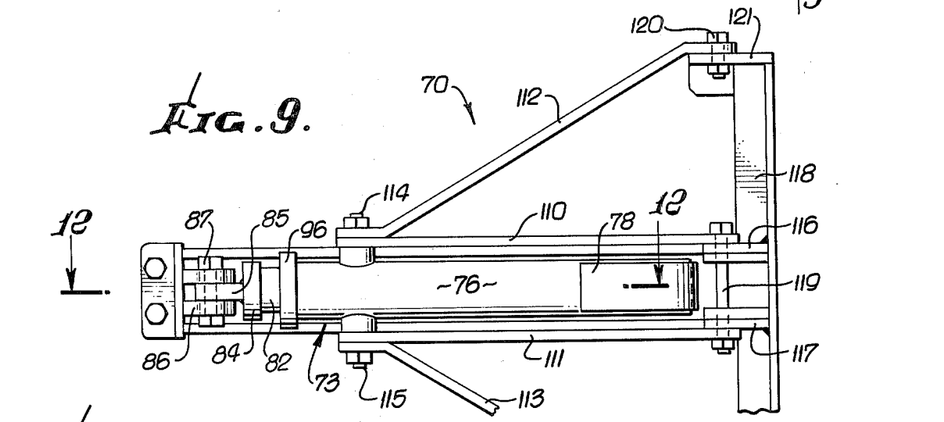
FIG. 9 is a bottom view on the line 9—9 of FIG. 8.
Figures 10, 11:
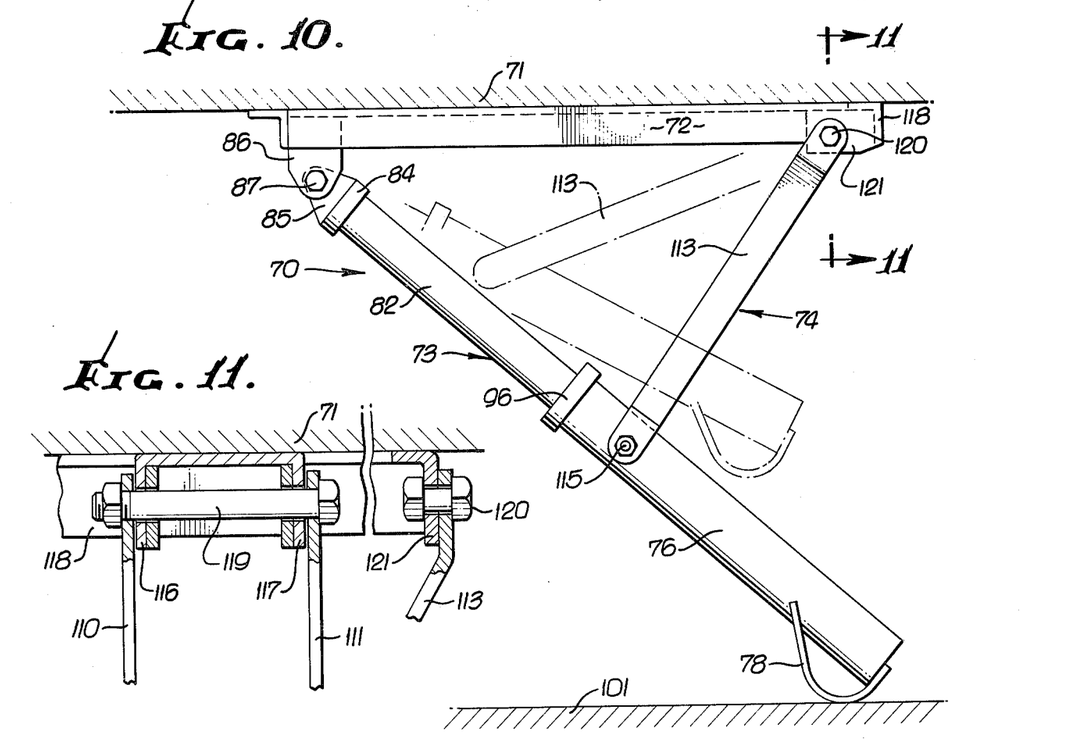
FIG. 10 is a side elevational view of the second form in bracing position.
FIG. 11 is a fragmentary cross sectional view on the line 11—11 of FIG. 10.

In order to swing the leg assembly 73 from the horizontal position of FIG. 8 to the extended operating position of FIG. 10 when the cylinder assembly is actuated, use is made of the link 74. The link 74 is a double system of straps comprising parallel straps 110 and 111 and diagonal straps, 112 and 113. Studs 114 and 115 extending outwardly from the jacket 76 are employed to attach adjacent ends of both parallel and diagonal straps to the jacket. Opposite ends of the parallel straps 110 and 111 are secured to brackets 116 and 117 on an angle strip 118 by means of a bolt 119. Bolts 120 secure opposite ends of the diagonal straps 112 and 113 to appropriate brackets 121 on the angle strip 118. The angle strip 118 is secured to the frame 73 and thereby attached to the chassis 71.

In operation when the leg assembly 70 is to be extended from the horizontal position of FIG. 8 to the operative position of FIG. 10, hydraulic pressure is applied through the line 103 and passage 102 to the piston head 88 thereby to drive the piston rod outwardly of the leg assembly. As this takes place, the leg is swung downwardly by action of the link 74 until the foot piece 78 strikes the ground surface 122. While this is taking place, the other hydraulic line 105 by appropriate means is fed into the reservoir (not shown).

When the leg assembly is to be retracted, hydraulic pressure is applied through the hydraulic line 105 and passage 104 to the chambers 83 and 91 while the chamber 106 is being permitted to discharge through the hydraulic line 103. As this takes place the piston head is moved in a direction from right to left as viewed in FIGS. 8, 9, 10 and 12, the action resulting in a swinging of the leg assembly upwardly by use of the link 74 in a reverse action from that described for extending the leg assembly.

For manipulating all of the hydraulic jacks either simultaneously or selectively, use is made of a central control indicated generally by the reference character 125, details of which are shown in FIGS. 14 through 24 inclusive.

Figure 24:
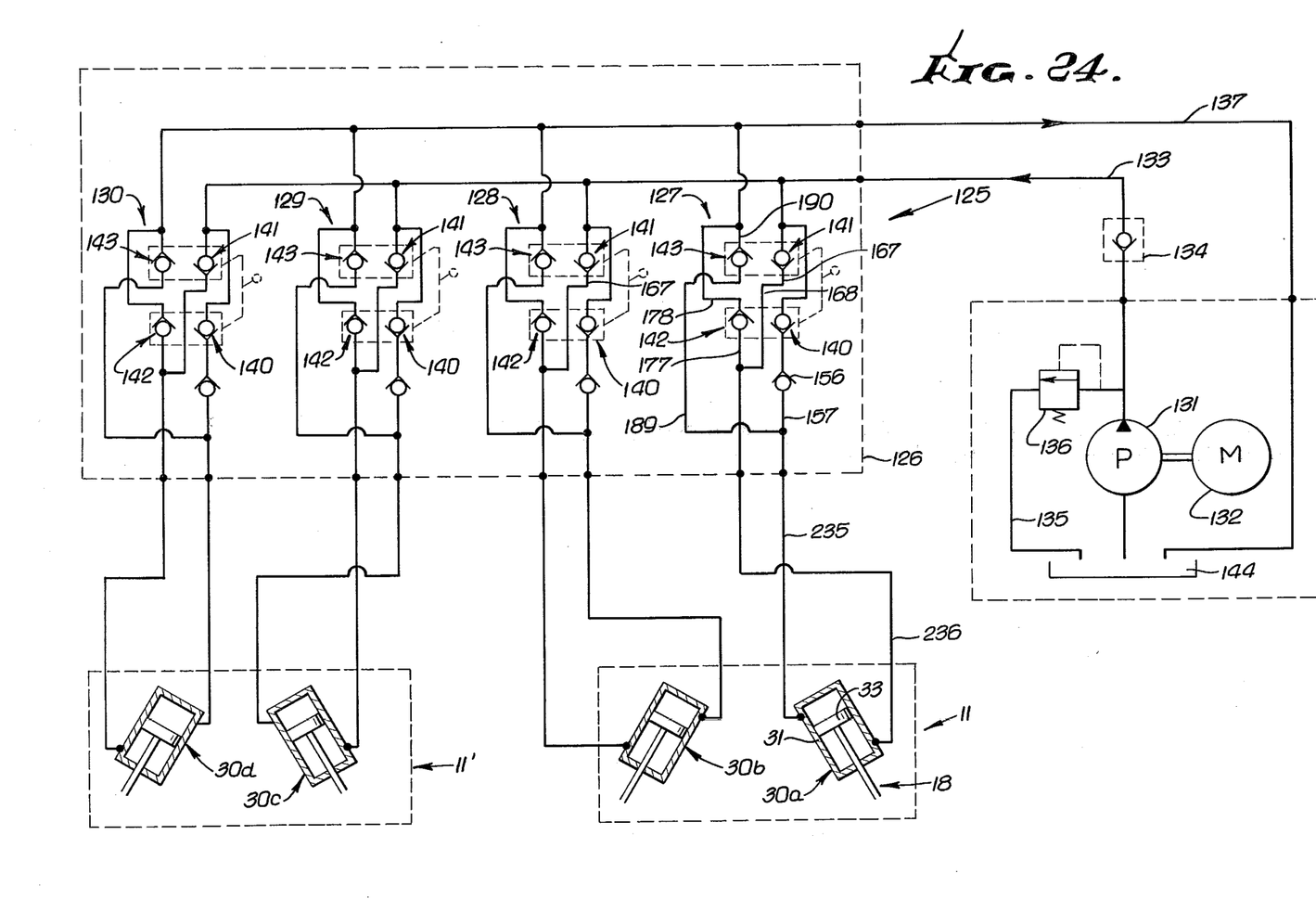
FIG. 24 is a schematic view of the hydraulic circuit including the valves of FIGS. 15 and 16.

As suggested by the schematic representation of FIG. 24 the central control consists of a manifold block 126 which accommodates four separate hydraulic valve units 127, 128, 129 and 130, one being for operation respectively of each of four hydraulic motors 30a, 30b, 30c and 30d. These may be either the hydraulic motors described in connection with FIGS. 1 through 5 inclusive, or those of FIGS. 8 through 13 inclusive. The hydraulic valve units are identical. Each in turn is supplied by a pump 131 driven by an appropriate motor 132. A hydraulic supply line 133 from the pump to each of the respective hydraulic drive units contains a check valve 134. A hydraulic bypass line 135 contains a relief valve 136 so that should all of the hydraulic drive units be simultaneously in off position while the pump 131 is operating, hydraulic fluid under pressure instead of building up pressure in the supply line 133, bypasses the pump affluent through the hydraulic bypass line back to a reservoir 144.

A hydraulic return line 137 fed from all of the hydraulic valve units carries hydraulic fluid back to the reservoir 144.

Structural details of the hydraulic valve units, exemplified by the hydraulic valve unit 127, are shown in FIGS. 15, 16, 17 and 18.

The hydraulic valve units 127, 128, 129 and 130 are all mounted on a top surface 138 of the manifold block 126, the mounting being in horizontal alignment. A housing 139, shown in FIGS. 17 and 18, encloses the top surface 138 and all of the hydraulic valve units mounted on it. Each of the hydraulic valve units comprises two supply valve devices 140 and 141 and two return valve devices 142 and 143.

The supply valve device 140 consists of a chamber 145 in the manifold block 126 closed at its outer end by a plug 146. At the bottom of the chamber 145 is a valve seat 147 on which a ball valve element 148 normally seats under pressure of a spring 149.

A valve stem 150 in the form of a plunger is reciprocatably mounted in a bore 151 in the manifold block in axial alignment with the chamber 145. A seal 152 held in place by a sealing plug 153 provided a sliding seal for the valve stem 150.

The chamber 155 is fed from the supply line 133 through a transfer supply passage 154. A discharge port 155 discharges through a check valve 156 to a hydraulic delivery line 157. See FIG. 24.

The other supply valve device 141 is similarly constructed in that it consists of a chamber 158 closed by a plug 159 and providing an annular valve seat 160. A ball valve element 161 is urged against the valve seat 160 by means of a spring 162.

Here also a valve stem 163 extends through a seal 164 to a bore 165, the seal being held in place by a sealing plug 166. The supply valve device 141 when discharging, discharges through a discharge port 167 to a delivery line 168. See FIG. 24.

Figure 16:
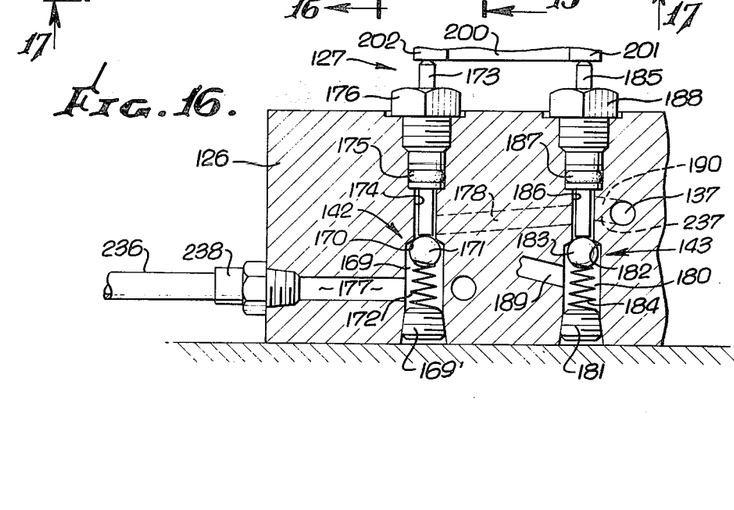
FIG. 16 is a cross sectional view on the line 16—16 of FIG. 14 showing the valves in neutral position.
Figure 17:
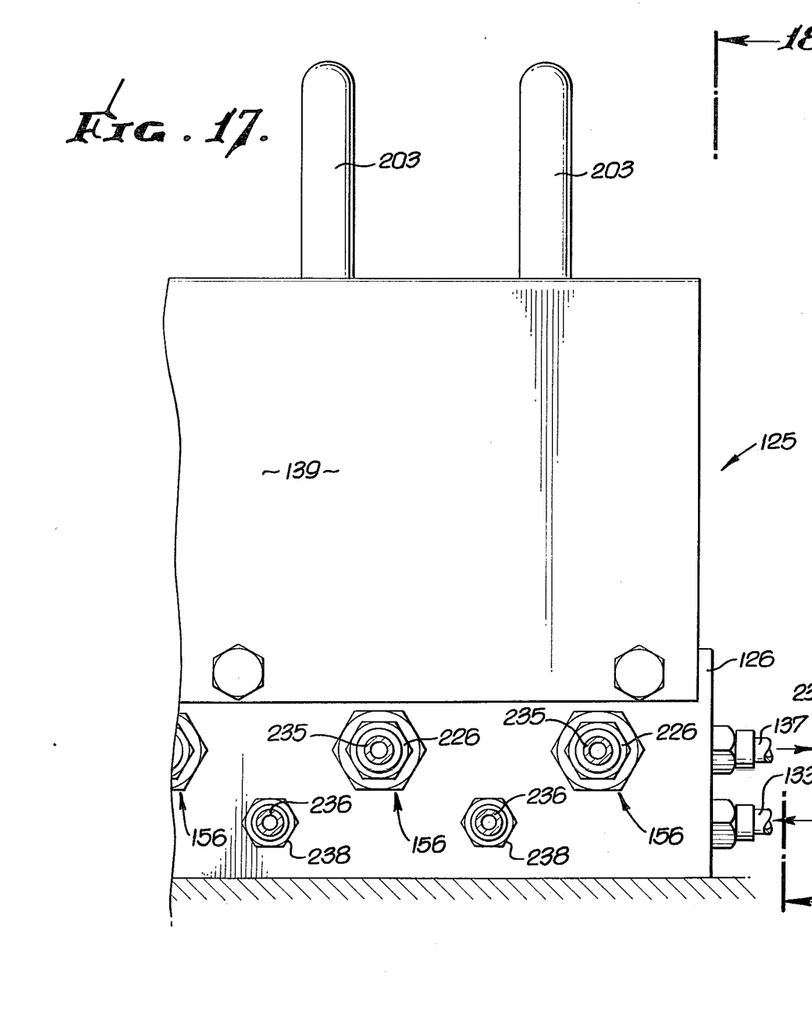
FIG. 17 is a fragmentary side elevational view on the line 17—17 of FIG. 14.

The return valve devices 142 and 143 illustrated in FIG. 16, for example, are similarly constructed. For the return valve device 142 there is a chamber 169 closed by a plug 169', there being an annular valve seat 170 at the bottom of the chamber. A ball valve 171 is pressed against the annular valve seat 170 by a spring 172. For opening the valve device there is provided a valve stem 173 reciprocatably mounted in a bore 174 and moving through a seal 175 which is held in place by a sealing plug 176.

A return passage 177 is in communication with the chamber 169 and the return valve device when open discharges through a return port 178 to the hydraulic return line 137 which carries fluid back to the reservoir.

The return valve device 143 is similarly constructed except that it is provided with a valve chamber 180 closed by a plug 181. At the bottom of the valve chamber is an annular valve seat 182 closed by a ball valve 183 pressed into closed position by a spring 184. The valve is unseated by operation of a valve stem 185 slidably mounted in a bore 186 and sliding relative to a seal 187 held in place by a sealing plug 188.

A hydraulic return passage 189 communicates with the chamber 180 and when the valve is opened, the valve discharges through a return port 190 which is in communication with the hydraulic return line 137.

Figure 18:
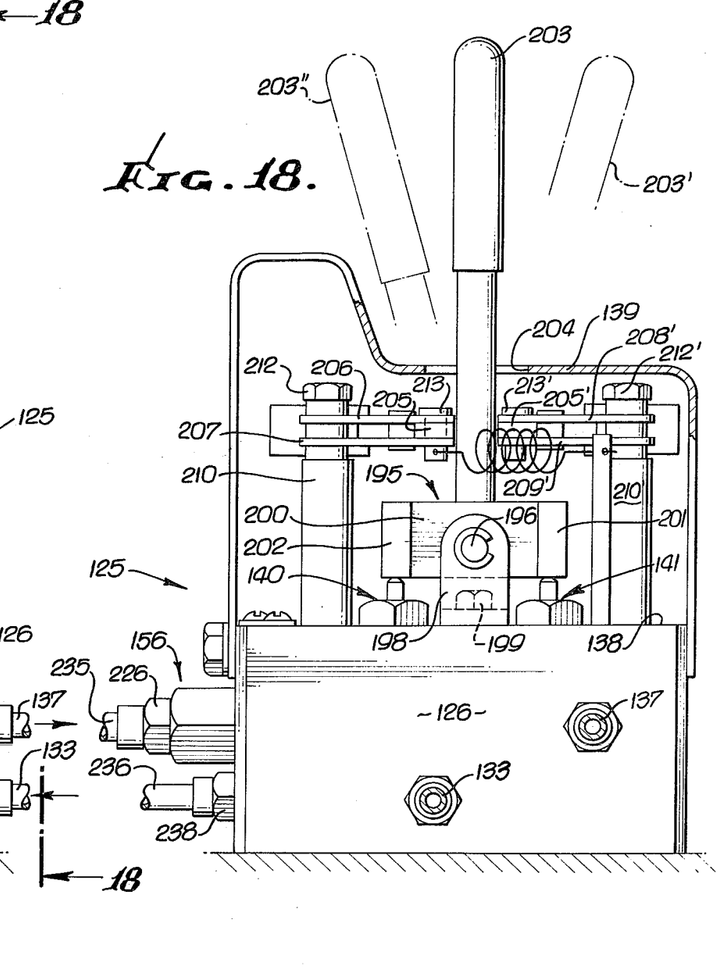
FIG. 18 is an end elevational view partly in section on the line 18—18 of FIG. 17.

For unseating the various ball valve elements in each of the respective hydraulic valve units, use is made of a handle member 195 which, as shown in FIG. 18, is pivotally mounted by means of a pivot shaft 196 to a pair of ears 197 and 198. The ears are appropriately secured to the top surface 138 of the manifold block 126 by means of bolts 199. The handle member consists in part of a rocker plate 200 which has at one end an actuator element 201 bridging the valve devices 141 and 143, and at the other end an actuator element 202 bridging the valve devices 140 and 142. A handle 203 on the rocker plate 200 extends upwardly through a hole 204 in the housing 139.

When only one or another of the hydraulic valve units 127, 128, 129 and 130, is to be manipulated in one direction, the pump is started by use of a bar 205 which extends lengthwise of the manifold block 126 to positions of engagement with all of the handles 203. The bar is supported by two pairs of levers, namely, the levers 206 and 207 at the right-hand end of the manifold block as viewed in FIG. 14, and the levers 208 at the left-hand end. The levers 206 and 207 are pivotally mounted upon a post 210, the levers 208 being mounted upon a post 211. The posts are anchored by means of appropriate bolts 212 to the manifold block 126. Pivot pins 213 pivotally attach the bar 205 to the respective levers.

A spring 215 attached at one end to the pivot pin 213 of the levers 206, 207 and at the other end to a spring retaining post 216 normally urges the bar 205 in a generally upwardly direction against the handles 203. On the opposite side of the bar 203 is a switch 217 having an armature 218 in engagement with the bar at the point 219. A switch button 219 is in a position to be activated by the armature 218 upon shifting the bar 205 in a direction from right to left and downwardly as viewed in FIG. 14 thereby to energize the motor 132 and start the pump 131. Movement of any one of the handles in the same direction will start the pump.

Figure 14:
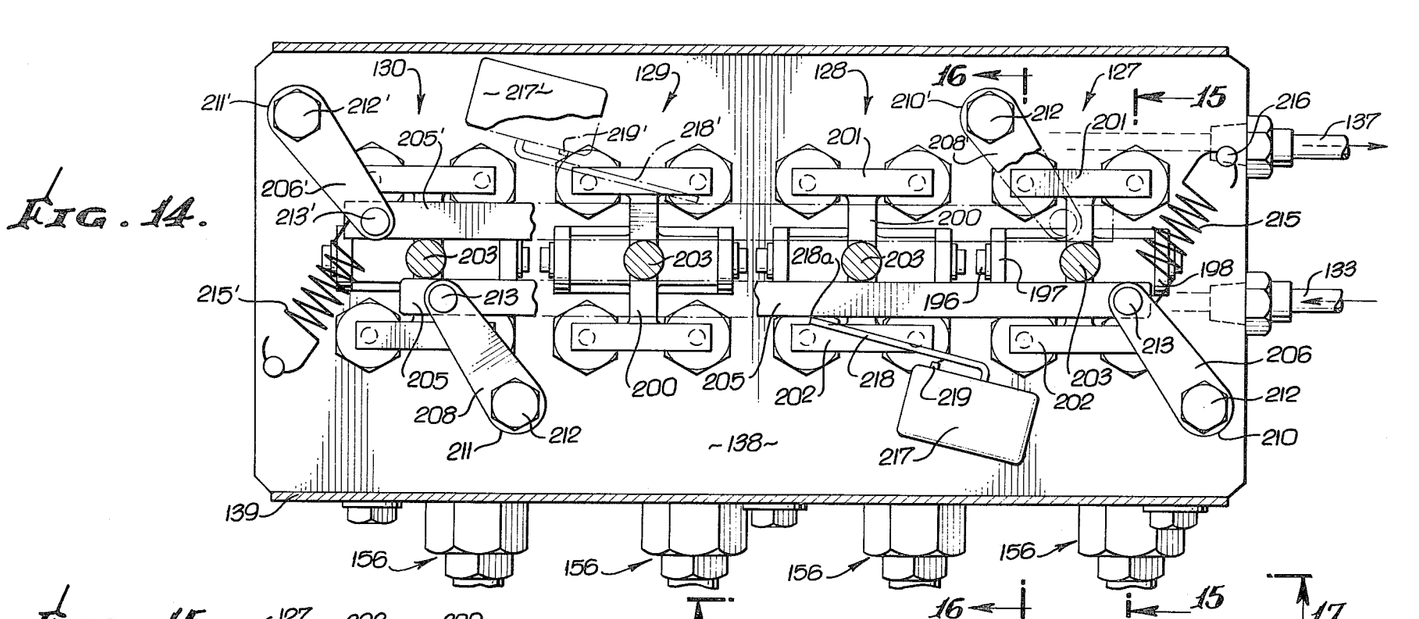
FIG. 14 is a plan view of the control valve system for four jacks.

Conversely when any one of the handles is moved in the opposite direction, clockwise to the position 203' as in FIG. 18 or upwardly as in FIG. 14, the handle moves against an oppositely located bar 205'. The bar 205' is supported by two pairs of levers, namely the levers 206' at the left-hand end of the manifold block as viewed in FIG. 14, and the levers 208' and 209' at the right-hand end. The levers 208' and 209' are pivotally mounted on a post 210', the levers 206' being mounted on a post 111'. The posts are anchored by bolts 212' to the manifold block 126 as previously described. Pivot pins 203' attach the bar 205 to the respective last mentioned levers.

A spring 215' attached to one of the pivot pins 213' and a post 216' normally urges the bar in a generally downward direction against the handles 203. A similar switch 217' having an armature 218' in engagement with the bar 205 is equipped with a switch button 219' for activation upon movement of the bar 205 in response to operation of any one of the handles 203.

Figure 23:
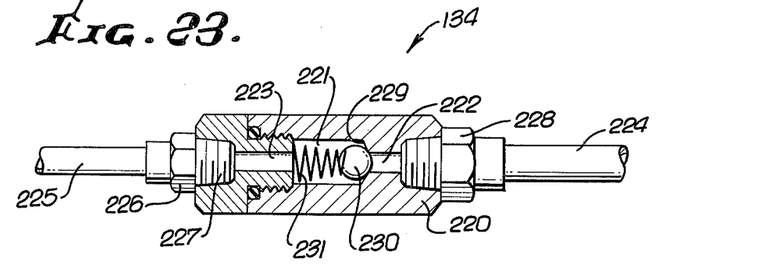
FIG. 23 is a longitudinal sectional view of one of the check valves.

A flow check valve, previously identified by the reference character 134 usable generally with the system at sundry locations, is shown in detail in FIG. 23. Substantially the same mechanism is embodied in the check valve 156 shown in FIG. 14, 15, 17, 18 and 24.

The check valve consists of a valve body 220 having a valve chamber 221 supplied by an upstream port 222 and a downstream port 223. Hydraulic lines suggested by the reference characters 224 and 225 may be made use of in conducting hydraulic fluid to and from the check valve. A fitting 226 held in a sealing plug 227 which closes one end of the valve chamber 221 connects with the hydraulic line 225. A comparable fitting 228 connects the hydraulic line 224 to the upstream port 222.

In the chamber is an annular valve seat 229 on which rests a ball valve element 230 urged into seating engagement by a spring 231.

In operation of the device reference is made to the schematic representation of FIG. 24 together with the structural features of FIGS. 14 through 23 inclusive.

Figure 15:
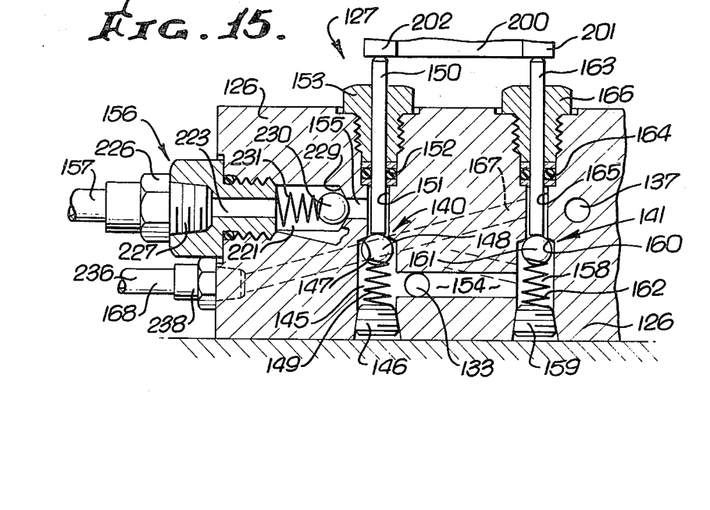
FIG. 15 is a cross sectional view on the line 15—15 of FIG. 14 showing the valves in neutral position.

When, for example, the hydraulic valve units are at neutral or inoperative position, the parts occupy the relationship shown in FIGS. 14, 15 and 16. In that position all of the hydraulic valve units are closed as indicated by the position of the ball valves on the respective valve seats, urged into that position by their respective springs.

Figure 21:
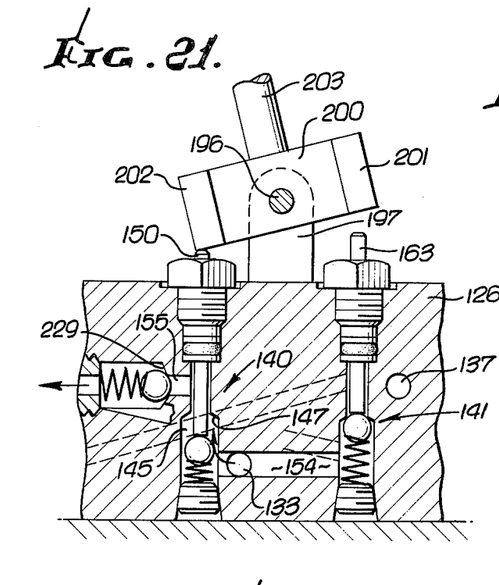
FIGS. 21 and 22 are cross sectional views similar to FIGS. 15 and 16 respectively showing the valves in lifting position.
Figure 22:
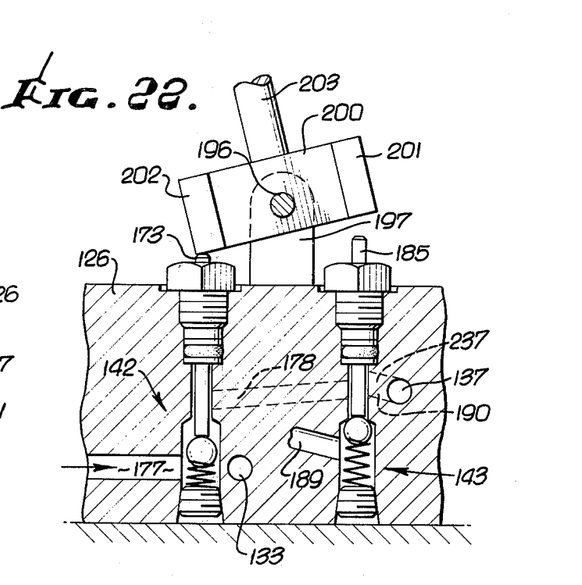

When one or another of the hydraulic motors 30a, 30b, 30c and 30d are to be operated to extend the sundry leg assemblies to extended position, the selected handle 203 is operated to shift the bar 205 in a direction from right to left and as viewed in FIG. 14 against tension of the spring 215, namely, to the broken line position 203" in FIG. 18 and to the solid line positions shown in FIGS. 21 and 22. The pump is then started by energizing the switch 217. The result of this handle movement is that the supply valve device 140 and the return valve device 142 are opened. The supply valve device 141 remains closed as does the return valve device 143.

In this valve condition, hydraulic fluid under pressure flows from the hydraulic supply line 133 into the chamber 145, then past the valve seat 147 to the discharge port 155 and from there past the check valve 156 (similar to the check valve 134) to the delivery line 157, thence to a common line 235 to the upper end of the hydraulic motor 30a. The same thing happens to each of the hydraulic motors 30b, 30c and 30d.

At the same time, the lower end of the hydraulic motor 30a is discharging through a common line 236 to a fitting 238, and then to the return passage 177 of the return valve device 142 which has been opened as shown in FIG. 22. From here the return fluid flows through the return port 178 of the return valve device 142 passing to the hydraulic return line 137, and thence to the reservoir 144. At the same time, the returning fluid is unable to pass through the line leading back to the supply valve device 141 because that valve has remained closed.

Conversely, when the hydraulic motor 30 is to be operated in the opposite direction, namely, to retract the respective leg assembly, hydraulic fluid under pressure is supplied to the lower side of the hydraulic motor 30a through the common line 236. At the same time hydraulic fluid is to be discharged from the top of the hydraulic motor through the common line 235.

Figure 19:
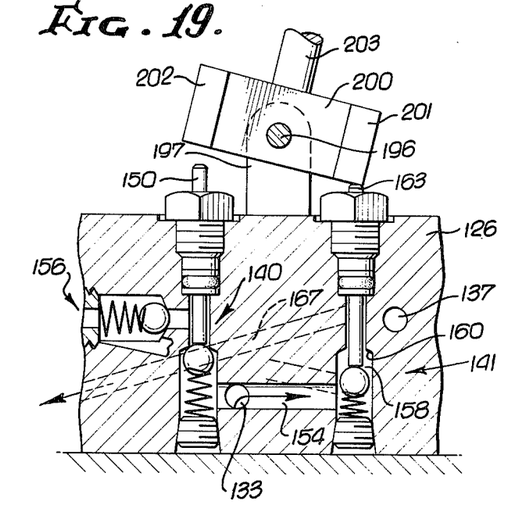
FIGS. 19 and 20 are cross sectional views similar to FIGS. 15 and 16 respectively showing the valves in lowering position for the jacks.
Figure 20:
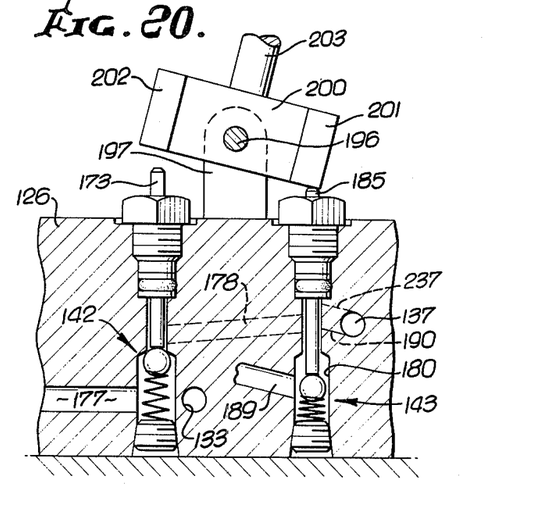

To accomplish the foregoing, the bar 205 is moved from left to right as viewed in FIG. 14 by pushing the respective handle 203 in the opposite direction, tilted clockwise as viewed in FIGS. 18, 19 and 20. This means the broken line position of 203' of FIG. 18 and the solid line positions of FIGS. 19 and 20.

As a consequence, the supply valve device 141 is opened as is the return valve device 143, by depressing respectively the valve stems 163 and 165. When this occurs hydraulic fluid under pressure from the hydraulic supply line 133 flows through the transverse supply passage 154 to the valve chamber 158 and thence past the valve seat 160 to the discharge port 167. From the discharge port 167 hydraulic fluid under pressure passes to the common line 236, being prevented by closed position of the return valve device 142 from passing to the hydraulic return line. As a consequence pressure is applied to the underside of the piston 33 and the piston is raised.

At the same time hydraulic fluid above the piston passes through the common line 235 to the return passage 189 and to the chamber 180 of the return valve device 143. From there the fluid passes through a return port 237 to the hydraulic return line 137 and thence back to the reservoir 144.

Although only one of the handles 203 has been described as being manipulated to shift the bar 205, it will be understood that any two of the handles 203 also can be manipulated simultaneously to either raise or lower the respective leg assemblies, whereby, for example, to lift the front end, the rear end or one side of the vehicle.

While the invention has herein been shown and described in what is conceived to be a practical and effective embodiment, it is recognized that departures may be made therefrom within the scope of the invention, which is not be limited to the details disclosed herein but is to be accorded the full scope of the claims so as to embrace any and all equivalent devices.

Having described the invention, what is claimed as new in support of Letters Patent is:

1. A supporting jack structure for a motor vehicle having a fore and aft extending vehicle chassis, said jack structure comprising a leg assembly at each of four corners of the chassis, each said leg having a free end and a captive end, a pivotal attachment between the captive end and the respective corner of the chassis for pivotal movement of the leg in a generally downward direction from initial position substantially parallel with the chassis, said leg assembly comprising a plurality of telescoping tube means in the form of a hydraulic cylinder assembly, said assembly comprising outermost and inner tube means, the inner tube means comprising the captive end of said leg assembly, the outermost tube means comprising the free end of said leg assembly, a guide link having one end pivotally secured to the chassis and the other end secured to the outermost tube means, and a header adjacent to and comprising part of the captive end of said leg assembly, said header having one passage within the outermost tube means connected to one end of the hydraulic cylinder assembly 20 and another passage within the outermost tube means connected to the other end of the hydraulic cylinder assembly whereby to alternately extend and retract said leg assembly.

2. A supporting jack structure for a motor vehicle having a fore and aft extending vehicle chassis, said jack structure comprising a leg assembly at each of four corners of the chassis, each said leg having a free end and a captive end, a pivotal attachment between the captive end and the respective corner of the chassis for pivotal movement of the leg in a generally downward direction from initial position substantially parallel with the chassis, a guide link having one end pivotally secured to the chassis and the other end pivotally secured to the leg assembly intermediate opposite ends of said leg assembly, said leg assembly comprising a plurality of telescoping tubes in the form of a hydraulic cylinder assembly, one of said tubes comprising the captive end of said leg assembly and another of said tubes comprising the free end of said leg assembly, and a header adjacent to and comprising part of the captive end of said leg assembly, said header having one passage connected to one end of the hydraulic cylinder assembly and another passage connected to the other end of the hydraulic cylinder assembly whereby to alternately extend and retract said leg assembly, the plurality of telescoping tubes comprising an outermost tube forming a jacket and to which said link is pivotally secured, an innermost tube and an intermediate tube having a space therebetween, said innermost tube and said intermediate tube forming the captive end of said leg, and a piston slidably mounted in the innermost tube and having a space therebetween forming a chamber, said space being interconnected by a passage through the wall of the innermost tube, the outer end of said piston having a connection to the outer end of said jacket structure.

3. A supporting jack structure as in claim 2 wherein there is a foot piece at the outer end of each jacket extending diametrically outwardly from the longitudinal axis of said jacket and in the direction parallel to the attachment of the leg assembly to the chassis.

4. A supporting jack structure as in claim 3 wherein said link comprises an inner pair of straps parallel to and adjacent the wall of said jacket and an outer pair of straps extending from the jacket in diagonally outward directions to locations of pivotal engagement with said chassis.

* * * * *